United States Patent
Kreth

(10) Patent No.: US 12,069,205 B2
(45) Date of Patent: Aug. 20, 2024

(54) SYSTEM, APPARATUS, AND METHOD FOR AUTOMATED DELIVERY OF DIGITAL INFORMATION

(71) Applicant: Paul Gregory Kreth, Little Rock, AR (US)

(72) Inventor: Paul Gregory Kreth, Little Rock, AR (US)

( * ) Notice: Subject to any disclaimer, the term of this patent is extended or adjusted under 35 U.S.C. 154(b) by 0 days.

(21) Appl. No.: 16/774,688

(22) Filed: Jan. 28, 2020

(65) Prior Publication Data

US 2020/0267258 A1    Aug. 20, 2020

Related U.S. Application Data

(60) Provisional application No. 62/805,559, filed on Feb. 14, 2019.

(51) Int. Cl.
*H04M 3/42*       (2006.01)
*H04M 3/493*      (2006.01)

(52) U.S. Cl.
CPC ..... *H04M 3/42382* (2013.01); *H04M 3/4936* (2013.01); *H04M 3/4938* (2013.01)

(58) Field of Classification Search
CPC .......... H04M 3/42382; H04M 3/4938; H04M 3/4936; H04M 7/0045; H04M 7/0048; H04M 7/0051; H04M 7/0054
See application file for complete search history.

(56) References Cited

U.S. PATENT DOCUMENTS

| | | |
|---|---|---|
| 5,825,856 A | 10/1998 | Porter et al. |
| 6,411,686 B1 | 6/2002 | Porter et al. |
| 6,973,166 B1 | 12/2005 | Tsumpes |
| 7,092,738 B2 | 8/2006 | Creamer et al. |
| 7,515,695 B1 | 4/2009 | Chan et al. |
| 7,539,287 B2 | 5/2009 | Hunter |
| 7,760,072 B2 | 7/2010 | Lund |
| 7,894,592 B2 | 2/2011 | Book et al. |
| 7,986,773 B2 | 7/2011 | Kalahasti et al. |
| 8,054,952 B1 | 11/2011 | Or-Bach et al. |
| 8,265,234 B2 | 9/2012 | Singh |
| 8,320,891 B1 | 11/2012 | Delker et al. |
| 8,548,131 B1 | 10/2013 | Lavian et al. |
| 8,553,859 B1 | 10/2013 | Lavian et al. |
| 8,625,756 B1 | 1/2014 | Lavian et al. |
| 8,661,112 B2 | 2/2014 | Creamer et al. |
| 8,725,630 B1 | 5/2014 | Delinsky et al. |
| 8,731,148 B1 | 5/2014 | Lavian et al. |

(Continued)

*Primary Examiner* — Justin Y Lee

(74) *Attorney, Agent, or Firm* — DUNLAP CODDING, P.C.

(57) ABSTRACT

Methods and system for the automated delivery of digital information are disclosed, included a system comprising at least one computer processor and one or more non-transitory memory storing a set of instructions, that when executed by the at least one processor cause the at least one processor to receive a telephone call from a telephonic device identified with a phone number and associated with a caller; determine the phone number associated with the telephonic device without input from the caller; receive an indicator, the indicator being a request for digital information to be transmitted to the telephonic device; and transmit digital information to the telephonic device based on the determined phone number.

12 Claims, 3 Drawing Sheets

(56) References Cited

U.S. PATENT DOCUMENTS

| | | |
|---|---|---|
| 8,818,905 B2 | 8/2014 | Perkins et al. |
| 8,867,708 B1 | 10/2014 | Lavian et al. |
| 9,172,802 B1 | 10/2015 | Hopkins |
| 9,247,059 B1 | 1/2016 | Chidambaram |
| 9,374,693 B1 | 6/2016 | Olincy et al. |
| 9,420,103 B1 | 8/2016 | Varman et al. |
| 9,560,199 B2 | 1/2017 | Mezhibovsky et al. |
| 9,609,102 B1 | 3/2017 | Cooper et al. |
| 9,736,310 B2 | 8/2017 | Casasola et al. |
| 9,936,073 B2 | 4/2018 | Sasidharan et al. |
| 9,961,206 B1 | 5/2018 | Hollander et al. |
| 10,168,867 B2 | 1/2019 | Blanchard et al. |
| 2003/0026409 A1 | 2/2003 | Bushey et al. |
| 2003/0043978 A1 | 3/2003 | Gallagher |
| 2003/0223566 A1 | 12/2003 | Book et al. |
| 2004/0029565 A1 | 2/2004 | Shibata et al. |
| 2004/0047453 A1 | 3/2004 | Fraser |
| 2004/0062232 A1 | 4/2004 | Sylvain |
| 2004/0111269 A1 | 6/2004 | Koch |
| 2004/0243300 A1* | 12/2004 | Nakajima .......... G01C 21/3629 701/1 |
| 2005/0108520 A1* | 5/2005 | Yamamoto .............. G06F 21/35 713/155 |
| 2008/0095330 A1 | 4/2008 | Jin et al. |
| 2009/0279678 A1* | 11/2009 | Ross ................... H04M 3/4938 379/93.23 |
| 2010/0166158 A1 | 7/2010 | Costello et al. |
| 2010/0208874 A1* | 8/2010 | Anupam ........... H04M 15/8083 379/88.22 |
| 2011/0270661 A1 | 11/2011 | Heiser, II et al. |
| 2012/0315880 A1 | 12/2012 | Peitrow et al. |
| 2013/0077772 A1* | 3/2013 | Lichorowic .......... H04M 1/271 379/88.02 |
| 2013/0108030 A1 | 5/2013 | Snir et al. |
| 2013/0163746 A1 | 6/2013 | Wick et al. |
| 2016/0370952 A1 | 12/2016 | Karnewar |
| 2017/0180552 A1 | 6/2017 | Krinsky et al. |
| 2017/0201624 A1* | 7/2017 | Runyan ............... H04M 3/4935 |

\* cited by examiner

SYSTEM, APPARATUS, AND METHOD FOR AUTOMATED DELIVERY OF DIGITAL INFORMATION

INCORPORATION BY REFERENCE

The present patent application claims priority to the provisional patent application identified by U.S. Ser. No. 62/805,559, the entire content of which is hereby incorporated herein by reference.

BACKGROUND

The present invention relates to communication systems, and more particularly to systems for conveying messages and other digital content to a mobile communications device of a caller via telecommunications systems. In this document, the term "caller(s)", may be used interchangeably with the terms "user(s)," "customer(s)," and "consumer(s)."

Consumers become easily disengaged with inefficient and complicated information exchanges utilizing current telecommunications technologies. Businesses lose revenue when consumers terminate communications or decline to opt in to communications due to the frustration of the processes being too time consuming or complicated.

To receive message information delivery to a device, current communications answering systems require the caller to hang up an existing call, then send a "keyword" of some type to a short code or text number to receive the desired data. The user may forget the messaging sequence or become frustrated with the additional step(s) required and lose interest in completing a transaction. As a result, the business loses a potential customer or the customer may lose confidence in, or develop an unfavorable impression of, the business.

As can be seen, there is a need for improved systems, apparatus, and methods to deliver digital content responsive to a caller-initiated contact with an entity.

SUMMARY OF THE INVENTION

A system, apparatus and method for modern businesses employing Interactive Voice Response (IVR) telephone systems that allows the system to provide the user calling into the IVR system with information sent to their mobile calling device without any additional steps needed and without utilizing a prepopulated database. More particularly, the user can simply dial the 10-digit business telephone number, wait for the IVR to answer their call, then the caller can terminate the call and the requested data will be sent to the caller's mobile device for retrieval with no other action required of the caller. In another iteration of the invention, the caller can dial the IVR system and choose from a voice recorded menu option presented by the IVR with each menu option allowing for the transmittal of different types of MMS, SMS or other data to a mobile device with a single button or spoken word command.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale or in schematic in the interest of clarity and conciseness. Not every component may be labeled in every drawing. Like reference numerals in the figures may represent and refer to the same or similar element or function. In the drawings.

DETAILED DESCRIPTION

Figure 1:
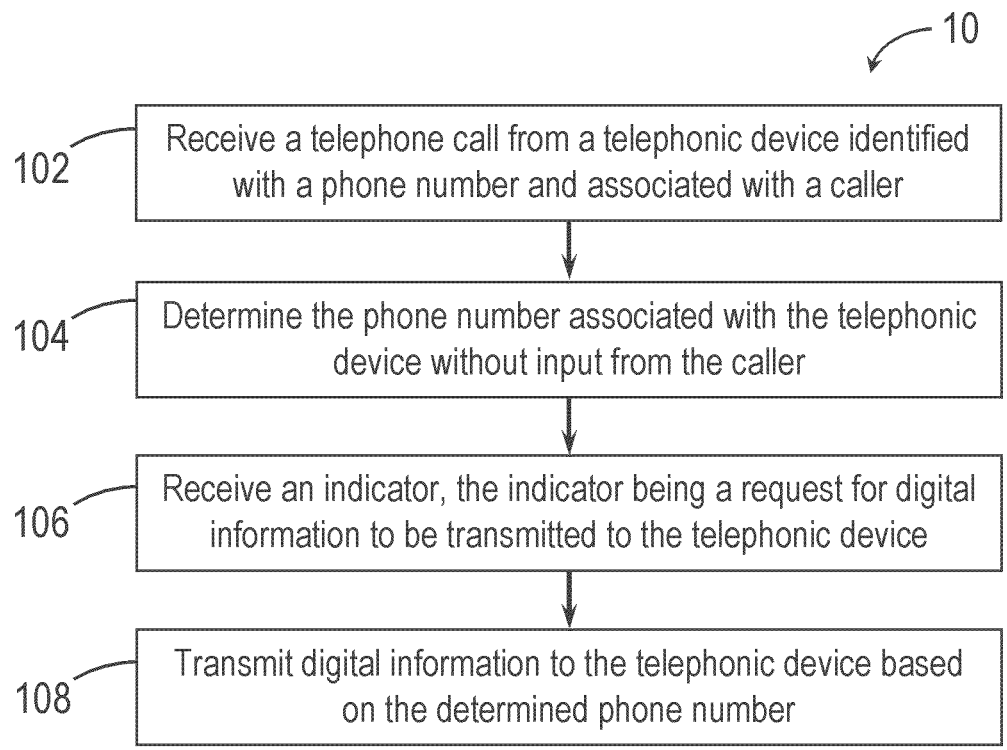
FIG. 1 is a process flow diagram of an exemplary embodiment of an automated method for delivering digital information in accordance with the present disclosure.

Before explaining at least one embodiment of the inventive concept disclosed herein in detail, it is to be understood that the inventive concept is not limited in its application to the details of construction and the arrangement of the components or steps or methodologies set forth in the following description or illustrated in the drawings. The inventive concept disclosed herein is capable of other embodiments or of being practiced or carried out in various ways. Also, it is to be understood that the phraseology and terminology employed herein is for the purpose of description and should not be regarded as limiting in any way.

In the following detailed description of embodiments of the inventive concept, numerous specific details are set forth in order to provide a more thorough understanding of the inventive concept. It will be apparent to one of ordinary skill in the art, however, that the inventive concept within the disclosure may be practiced without these specific details. In other instances, well-known features have not been described in detail to avoid unnecessarily complicating the instant disclosure.

As used herein, the terms "network-based", "cloud-based" and any variations thereof, are intended to include the provision of configurable computational resources on demand via interfacing with a computer and/or computer network, with software and/or data at least partially located on the computer and/or computer network, by pooling processing power of two or more networked processors.

As used herein, the terms "comprises", "comprising", "includes", "including", "has", "having", or any other variation thereof, are intended to be non-exclusive inclusions. For example, a process, method, article, or apparatus that comprises a set of elements is not limited to only those elements but may include other elements not expressly listed or even inherent to such process, method, article, or apparatus.

As used in the instant disclosure, the terms "provide", "providing", and variations thereof comprise displaying or providing for display a webpage (e.g., company webpage) to one or more user terminals interfacing with a computer and/or computer network(s) and/or allowing the one or more user terminal(s) to participate, such as by interacting with one or more mechanisms on a webpage (e.g., company webpage) by sending and/or receiving signals (e.g., digital, optical, and/or the like) via a computer network interface (e.g., Ethernet port, TCP/IP port, optical port, cable modem, and combinations thereof). A user may be provided with a web page in a web browser, or in a software application, for example.

Further, unless expressly stated to the contrary, "or" refers to an inclusive or and not to an exclusive or. For example, a condition A or B is satisfied by anyone of the following:

A is true (or present) and B is false (or not present), A is false (or not present) and B is true (or present), and both A and B are true (or present).

In addition, the use of the "a" or "an" are employed to describe elements and components of the embodiments herein. This is done merely for convenience and to give a general sense of the inventive concept. This description should be read to include one or more, and the singular also includes the plural unless it is obvious that it is meant otherwise.

Circuitry, as used herein, may be analog and/or digital components, or one or more suitably programmed processors (e.g., microprocessors) and associated hardware and software, or hardwired logic. Also, "components" may perform one or more functions. The term "component," may include hardware, such as a processor (e.g., microprocessor), an application specific integrated circuit (ASIC), field programmable gate array (FPGA), a combination of hardware and software, and/or the like. The term "processor" as used herein means a single processor or multiple processors working independently or together to collectively perform a task.

Software may include one or more computer readable instructions that when executed by one or more components cause the component to perform a specified function. It should be understood that the algorithms described herein may be stored on one or more non-transitory computer readable medium. Exemplary non-transitory computer readable mediums may include random access memory, read only memory, flash memory, and/or the like. Such non-transitory computer readable mediums may be electrically based, optically based, and/or the like.

As used herein, a telephonic protocol may include a mobile telephonic protocol, a landline telephonic protocol, or a VOIP telephonic protocol. The mobile telephonic protocol may include a cellular network, a Global System for Mobile Communications (GSM) network, a code division multiple access (CDMA) network, a 3G network, a 4G network, a 5G network, or an LTE network. A landline telephonic protocol may include a public switched telephone network. A VOIP telephonic protocol may include a Voice Over Internet Protocol. The telephonic protocol may include any communications protocol enabling bidirectional communication between two or more entities. The telephonic protocol may be implemented on any network, such as a World Wide Web (or Internet), a local area network (LAN), a wide area network (WAN), a metropolitan network, a wireless network, a bluetooth network, an Ethernet network, a cellular network, a Global System for Mobile Communications (GSM) network, a code division multiple access (CDMA) network, a 3G network, a 4G network, a 5G network, an LTE network, a satellite network, a radio network, an optical network, a cable network, combinations thereof, and/or the like. It is conceivable that in the near future, embodiments of the present disclosure may use more advanced networking topologies or telephonic protocols.

A telephonic device, as used herein, may include any device capable of conducting bidirectional communication with one or more other telephonic device(s) utilizing the telephonic protocol. The telephonic device may include a landline telephone, a cordless telephone, a VOIP telephone, a cell phone, a smart phone, a tablet, a desktop computer, a laptop, a game console, a smart watch, a smart appliance, or the like.

Finally, as used herein any reference to "one embodiment" or "an embodiment" means that a particular element, feature, structure, or characteristic described in connection with the embodiment is included in at least one embodiment. The appearance of the phrase "in one embodiment" in various places in the specification are not necessarily all referring to the same embodiment.

Broadly, embodiments of the present disclosure provide a system, method, apparatus and computer program product to provide messaging functionality to a telephone answering system. The present disclosure simplifies the exchange of data and communications to smartphones, tablet devices and computers users.

Referring now to the drawings, FIG. 1 is a process flow chart depicting one embodiment of an automated method 10 for delivering digital information for transmitting digital information or data from a host system 12 to a telephonic device 14 associated with a caller 16 without requiring the caller 16 to pre-register with the host system 12, i.e., without caller pre-registration with the host system 12, or without requiring the caller 16 to provide a phone number.

Generally, the automated method 10 includes receiving a telephone call from the telephonic device 14 identified with a phone number and associated with a caller 16 (step 102), determining the phone number associated with the telephonic device 14 without input from the caller 16 (step 104), receiving an indicator, the indicator being a request for digital information to be transmitted to the telephonic device 14 (step 106), and transmitting the digital information to the telephonic device 14 based on the determined phone number (step 108).

One non-exclusive example of an entity that may implement the automated method 10 is a call center associated with a commercial business. For exemplary purposes, the automated method 10 will generally be carried out by a host system 12 associated with an undefined entity. However, it will be understood that the automated method 10 may be implemented for the benefit of a government agency, a non-profit organization, a private individual, and/or any other type of entity that may receive a call from a caller 16 whom has a desire to receive digital information.

The automated method 10 allows the host system 12 to transmit digital information to the telephonic device 14 associated with the caller 16 without requiring the caller 16 to provide the phone number associated with the telephonic device 14. However, it should be understood that it may be necessary or at least advantageous in some cases to allow the caller 16 a capability to manually or verbally input the telephone number associated with the telephonic device 14 that the caller 16 would like to receive digital information. For example, the host system 12 may recognize the telephonic device 14 that the caller 16 used to place the call is a landline telephone and may be incapable of receiving digital information in a format in which it was to be transmitted. In another example, the caller 16 may wish to receive the digital information via a telephonic device 14 other than the one used to place the telephone call. In these examples, the caller 16 may be provided with an option to manually or verbally input the telephone number associated with the telephonic device 14 to which the caller 16 would like the digital information to be transmitted. The host system 12 may be provided with voice recognition software for interpreting verbal input from the caller 16.

For purposes of this disclosure, the indicator is a request for digital information to be transmitted to the telephonic device 14 and may be communicated to the host system 12 by the caller 16 in one or more ways. In one embodiment, the indicator may be a dual-tone multi-frequency (DTMF) input from a keypad on a touch-tone phone by the caller 16, a verbal expression received from the caller 16, or the absence of DTMF input or verbal expression from the caller 16. For example, the caller 16 may press a number on the keypad of the telephonic device 14, the caller 16 may make a statement into the receiver of the telephonic device 14, such as "I would like to receive digital information," or the caller 16 may remain on the call a certain amount of time without any input. In one embodiment, the caller 16 causing the telephone call to end may be the indicator that signifies the caller 16 would like to receive digital information.

In one embodiment, a caller 16 dials the phone number of an entity, such as a business. The caller 16 listens to a recorded voice menu option for the host system 12. The caller 16 may select an option from the voice menu indicating a request that certain digital information, such as communications, data, and/or other information, be sent to the caller 16 via text, SMS, or other message.

Figure 2:
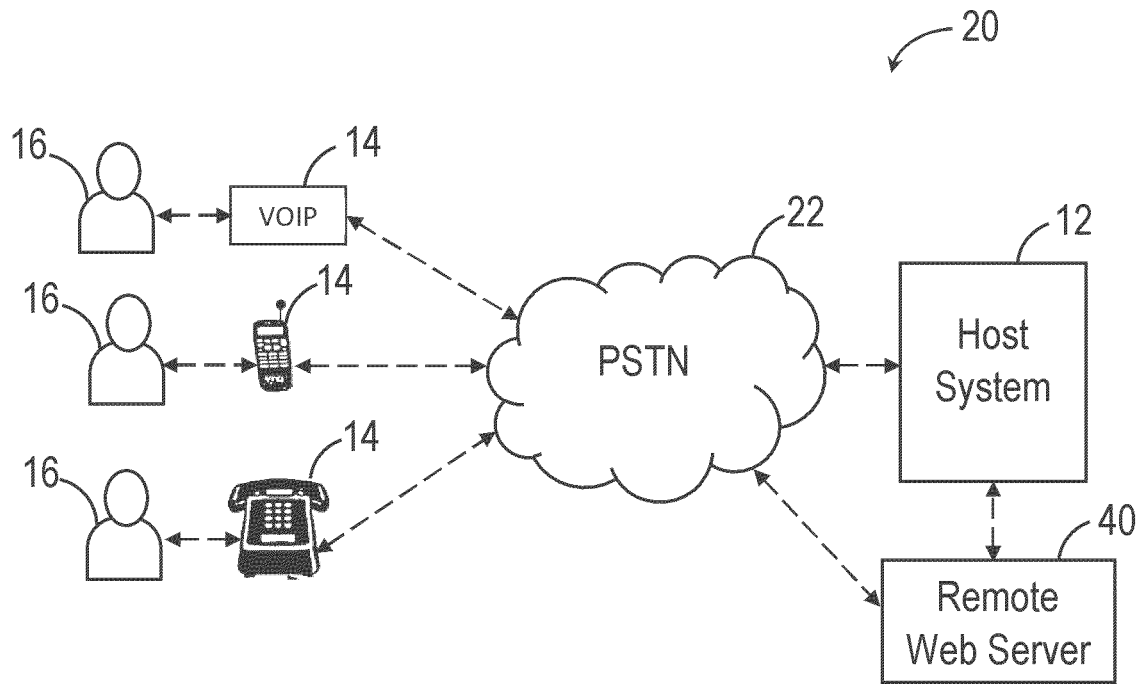
FIG. 2 is a schematic diagram of an exemplary system in accordance with the present disclosure.
Figure 3:
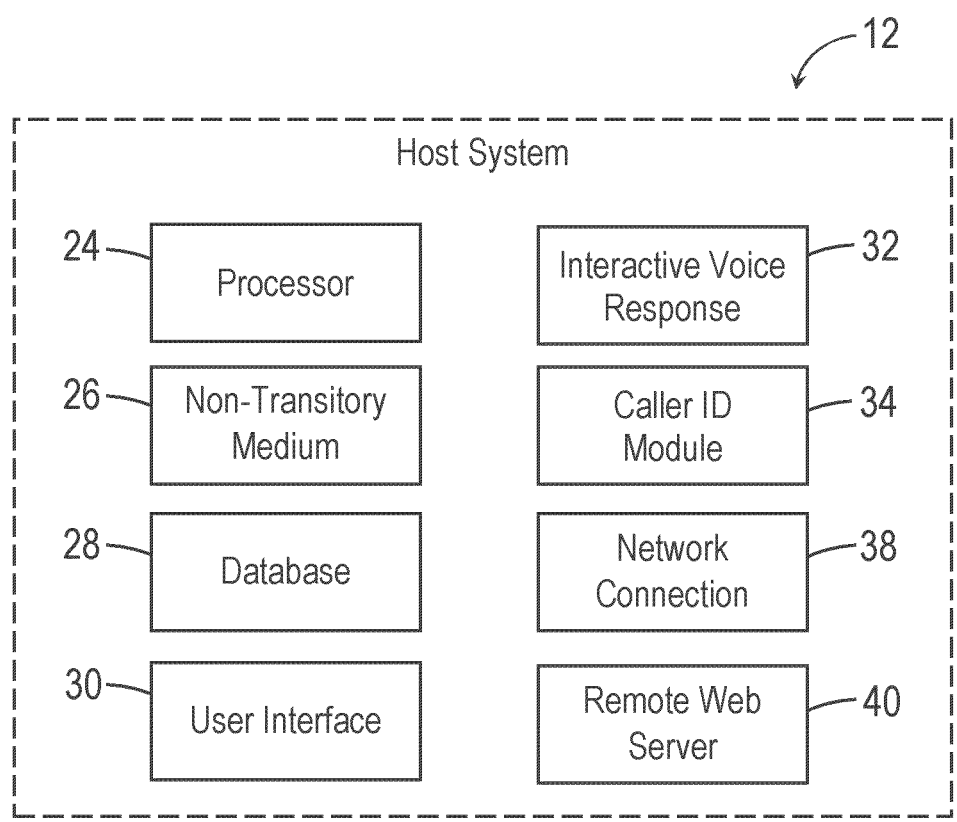
FIG. 3 is a schematic diagram of an exemplary host system in accordance with the present disclosure.

As depicted in FIGS. 2 and 3, in one embodiment, an automated delivery of digital information system 20, according to the instant disclosure, may comprise the host system 12 interfacing and/or communicating with one or more telephonic device 14 via a public switch telephone network (PSTN) 22. The one or more telephonic device 14 being able to be individually identified by a distinct phone number and associated with the caller 16. In one embodiment, the host system 12 may include an automatic answering feature allowing the host system 12 to answer an incoming telephone call from one or more telephonic device 14.

In one embodiment, the host system 12 may include at least one computer processor 24 configured to execute processor executable code stored on one or more non-transitory memory 26, and one or more database 28. The at least one computer processor 24 may be configured to read and/or execute processor executable code and/or of creating, manipulating, altering, and/or storing computer data structures into the one or more non-transitory memory 26 (which may also be referred to herein as non-transitory computer readable medium 26). In one embodiment, the host system 12 may include at least one computer with a user interface 30. The computer may include any computer including, but not limited to, a desktop, laptop, and smart device, such as, a tablet and smart phone. The computer includes a program product including a machine-readable program code for causing, when executed, the computer to perform steps. The program product may include software which may either be loaded onto the computer or accessed by the computer. The loaded software may include an application on a smart device. The software may be accessed by the computer using a web browser. The computer may access the software via the web browser using the internet, extranet, intranet, host server, internet cloud, and the like.

The host system 12 may include an interactive voice response (IVR) 32. The IVR 32 is an automated telephony system technology that is capable of interacting with the caller 16 and gathering information from the caller 16 through the use of voice recognition and/or dual-tone multi-frequency (DTMF) tones input into the telephonic device 14. In one embodiment, the IVR 32 may use a speech recognition technology that enables the IVR 32 to recognize and translate spoken language by the processor 24.

The entity may use the IVR 32 of the host system 12 to offer the caller 16 different options for what the caller 16 might be seeking. For example, does the caller 16 need to speak to someone in person, or does the caller 16 need to know some information or other data that could be sent to the caller 16 as a hyperlink?

The host system 12 may include a caller identification module 34 capable of identifying the telephone number associated with the telephonic device 14 that called the host system 12. The caller identification module 34 may receive a data stream from a phone carrier associated with the telephonic device 14 that initiated the phone call. The data stream may include a 7-digit number or a 10-digit number that represents the phone number associated with the telephonic device 14. The data stream may include any symbol string, such as numeric, alphanumeric, symbol, and/or combinations thereof (of any length) that is used to identify the telephonic device 14. The data stream may also include additional information related to the telephonic device 14, such as, a name associated with the telephonic device 14, a phone carrier for the telephonic device 14, a date and time of the call, and a type of telephonic protocol used by the telephonic device 14.

The IVR 32 may receive the determined phone number and additional information from the caller identification module 34 to determine whether host system 12 is capable of transmitting the digital information to the telephonic device 14 based on the determined phone number and additional information. For example, if the determined phone number is associated with a landline, the IVR 32 may prompt the caller 16 to provide a mobile phone number to which the digital information may be transmitted.

The caller identification module 34 may provide the determined phone number and additional information to the non-transitory memory 26, so that the determined phone number may be stored and accessed when the host system 12 transmits the digital information to the telephonic device 14. In one embodiment, the determined phone number and additional information obtained by the caller identification module 34 may be stored in the database 28 for record keeping or future data analysis.

In one embodiment, the host system 12 may be set up via a Voice Over Internet Protocol (VOIP) phone system with a network connection 38 that may connect to a remote web server 40. The at least one computer processor 24 may provide a set of instructions to the remote web server 40 to cause the remote web server 40 to transmit the digital information to the telephonic device 14 based on the phone number determined by the caller identification module 34. In one embodiment, the host system 12 may include the remote web server 40, wherein the remote web server 40 communicates directly with at least one computer processor 24 and the one or more non-transitory memory 26. In one embodiment, the remote web server 40 may be separate from the host system 12, wherein the remote web server 40 may communicate with the host system 12 via the network connects 38 and is in direct communication with the PSTN 22.

In use, the present disclosure reduces the number of steps an individual caller would need to remember and execute in order to receive desired information or data from an entity (such as directions, office hours, locations, forms, or other digital content or communications, including Payment Card Industry ("PCI") and Health Insurance Portability and Accountability Act ("HIPPA") compliant forms requiring secondary authentication). More specifically, the automated delivery of digital information system 20 allows the caller 16 to simply listen to a recorded message and choose from a simple menu option (by speaking or using a touch-tone phone command) to have the data or communication automatically sent to their mobile computing device by way of an SMS, MMS or other data message type.

Figure 4:
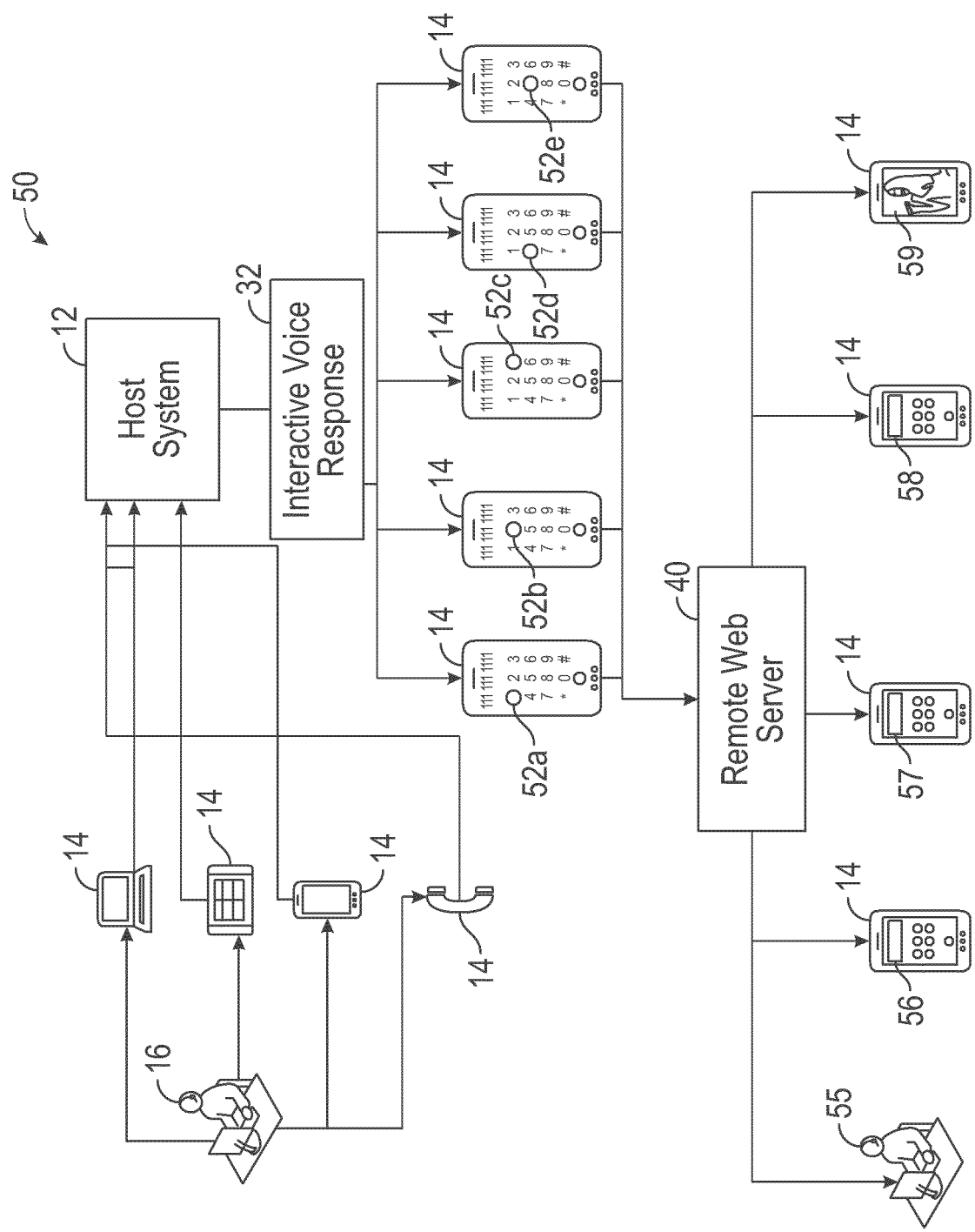
FIG. 4 is a flow chart for a frictionless calling process using automation to deliver digital information in accordance with the present disclosure.

In the example shown in FIG. 4, an exemplary flow chart for a frictionless calling process 50, the caller 16 dials the phone number of the entity via the one or more telephonic device 14. The host system 12 associated with the entity receives and answers the incoming call. The IVR 32 allows the caller to listen to the recorded menu option and may prompt the caller 16 to select a button 52a-52e to provide the request for digital information based on the menu options. For example, the caller 16 may be instructed to press number one button 52a to speak with an associate 55 at the location, press number two button 52b to be sent a hyperlink with directions to the location 56, press number three button 52c to receive an application download link 57, press number four button 52d to receive a specialized coupon or discount code 58, or press number five button 52e to receive a confirmation video or picture 59, etc.

In this example, if the caller 16 selects a number one button 52a, the IVR 32 transfers the call to ring a phone extension at the location so that the associate 55 can talk to the caller 16. If the caller 16 selects number two button 52b through number five button 52e, the host system 12 will instruct the remote web server 40 to execute a command based on the selection of the caller 16. The command executed by the remote web server 40 may be to transmit the communication, data, and/or information, such as the hyperlink with directions to the location 56, the application download link 57, the specialized coupon or discount code 58, or the confirmation video or picture 59. For example, if the caller 16 selects the number two button 52b, the remote web server 40 causes the hyperlink providing location directions 57 to be sent to the telephonic device 14 of the caller 16 by means of an SMS or other message type. The caller identification module 34 will identify the phone number of the caller 16 for authentication and storage on the database 28 and provide the remote web server 40 with the phone number of the caller 16. Prior to transmitting any communications, data, and/or information, the IVR 32 may notify the caller 16 that text and data message rates may apply. It should be understood that other menu options and types of communications, data, and/or information may be implemented.

The automated delivery of digital information system 20 may accomplish this by using an HTTP Notify procedure, which sends notifications to the remote web server 40 through a URL. The URL can then pass on the phone number of the telephonic device 14 as determined by the caller identification module 34. This process allows an event in the IVR 32 to trigger an action on a remote web server 40. Once the URL is entered in the node of the IVR 32 and that menu selection is chosen, that URL will be hit with an HTTP POST as calls pass through. The HTTP Notify procedure can use push technology, pull technology, or polling techniques. Exemplary commands include, but are not limited to, HTTP POST, HTTP PUT, HTTP PATCH, and HTTP GET.

By way of non-limiting example, the processor 24 utilizes a caller identification module 34 number and a Dialed Number to pass through an instruction to a remote web server located at www.example.com:

https://www.example.com/
example?caller={CALLER_ID_NUMBER}&dialed={DIALED_NUMBER}

In this example, the variables in the brackets { } are replaced with their actual value. For example, if a call to 501-525-0123 was placed from 910-566-1100, the URL would become:

https://www.example.com/examplecall.notification.php-?caller=105561100&
dialed=5015250123.

This HTTP POST, instructs the remote web server 40 that the caller's caller identification module is 910-556-1100 and depending on the execution script on the remote web server 40 certain responses will take place, such as an MMS, SMS or other type of data transmission back to the telephonic device 14 of the caller 16 or to other devices such as email to computers, fax transmissions, call back services, etc. In other versions of the present disclosure, the dialed number may be omitted. In these versions, the instruction may be in the form below.

https://www.example.com/
example?caller={CALLER_ID_NUMBER}

In other applications, the phone number of the caller 16 must be manually entered on the phone keypad to retrieve the desired information or a verbal command could be spoken in to the telephonic device 14 of the caller 16 and voice recognition could initiate the desired outcome.

The automated delivery of digital information system 20 described above allows a caller 16 to dial a phone number, which is then answered by a host system 12. The caller 16 then listens to a recorded message and is given an option menu to receive an automatic SMS message, text, or other communication with the information requested back to their device. This reduces the layers of complexity and the amount of time needed in obtaining the desired information by the caller 16.

Other systems require the caller 16 to navigate through additional layers of systems to obtain the desired communication, data, and/or information, resulting in an increase of time and frustration. The present disclosure eliminates the need to leave the current system to receive the requested communication, data and/or information, thereby reducing the steps needed to receive the desired communication and/or information.

In a first non-limiting example, the caller 16 dials the phone number of an entity because the caller 16 wishes to obtain certain information. Once the phone call is answered by the host system 12, the caller 16 is given a series of menu options to obtain various items of information. The caller 16 selects the desired menu option for the information the caller 16 wishes to obtain, either by entering the desired menu option on a touch-tone phone or speaking the requested option. Once the caller 16 makes a selection, the caller identification module 34 determines a phone number of the caller 16 or prompts the caller 16 to input a number manually, and then the host system 12 transmits the requested information via text, SMS, or other message.

In some embodiments, the use of the IVR 32 is needed to answer the incoming call, capture the phone number of the caller 16, terminate the call and send the desired information to the caller 16. In some other embodiments, the host system 12 is capable of accepting incoming calls and transmitting the desired information without the need of the IVR 32. The host system 12 could merely answer the incoming call, the caller identification module 34 would capture the phone number of the caller 16 then terminate the call and send the desired MMS, SMS or other data type requested without any type of voice message, voice recogntion, or menu being provided during the call.

In some embodiments, the IVR 32 could provide the caller 16 with a series of options from which the caller 16 selects. The manner of how to input these options could be by touch-tone phone or by the caller speaking their desired option. Once the desired option is selected, the host system 12 determines the phone number of the caller 16 via a caller identification module 34, or by the caller 16 manually entering a number if they wish the information sent to a different number. Based on the chosen option and the determined phone number, the host system 12 causes the desired information to be automatically sent via SMS, text, or other message to the caller 16 at the determined number.

The host system 12 preferably includes the IVR 32 in a configuration that is automated and capable of allowing the caller 16 to select one of several options from a menu. The IVR 32 may be capable of accepting input from the caller 16, but the method of input by the caller 16 may be optional. For example, the method of input could be merely the activity of the caller 16 calling the host system 12 and staying on the call long enough for the caller identification module 34 to recognize the phone number of the telephonic device 14, then the communication, data and/or information would be sent to the telephonic device 14 of the caller 16 by SMS, MMS, text, or other message type, and then the call would automatically terminate. However, a voice recognition system could potentially improve the experience of the caller 16.

The IVR 32 then determines the phone number to which the caller 16, e.g., customer, would want the information sent. The optimal and most efficient way to do this is by determining the phone number automatically via caller identification module 34 or a similar system. The same purpose can be accomplished by the caller 16 manually entering the desired phone number. The host system 12 then automatically sends the requested information to the caller 16 based on their chosen option and the determined phone number via SMS, text, or other message.

The point at which the phone number of the caller 16 is determined can be placed at any point along the chain of steps after the call has been placed. It is also possible to have separate phone numbers for the caller 16 to dial for the desired information rather than automated menu options.

By creating a system utilizing the steps set forth, the automated delivery of digital information system 20 would allow an entity to provide the caller 16 with desired communications, data and/or information with a minimum amount of "friction," layers, or number of steps needed. Without this automated delivery of digital information system 20, callers 16 are often required to disengage or terminate the call they have made to the entity and then manually send an SMS or text message to a separate text number and/or short code number provided to them by the automated system, or, in some instances, utilize a separate website or app, in order to obtain the desired information. This system allows this intermediate step(s) to be skipped and the information sent directly to the customer's mobile device.

While described in the context of the host system 12 of an undefined entity, the present invention can be used in multiple ways depending on the field of the entity. For instance, in the retail sector, this automated delivery of digital information system 20 could allow a customer to automatically opt in to marketing services, join a rewards club, obtain a coupon, or obtain information on store locations. Similarly, in the restaurant sector, the digital information system 20 could allow the customer to opt in for marketing services, joining a rewards or VIP club, obtain a coupon or other discount, obtain a menu, or obtain a form to place an order. The caller 16 may dial a phone number from the telephonic device 14 and automatically have the phone number logged by the caller identification module 34 for the purpose of validating of identification or use of coupon or discounts, proof of memberships, etc., tied to that particular telephonic device 14. For employers, this system could be used to provide a potential employee with a mobile hyperlink to a job application web page. For businesses that take regular payments, or setup payment plans, the system 20 can provide customers with a hyperlink to a web page that can take one-time payments or set up automatic withdrawals.

The system 20 can also be tailored to automatically text current balances, due dates, and other relevant information to the customer. In other businesses, where regular information needs to be exchanged between the customer and the business, or between the business and its employees, the system 20 could automatically provide hyperlinks to web pages capable of taking input of the desired information.

The systems and methods described above is for purposes of example only and may be implemented in any type of computer system or programming or processing environment, or in a computer program, alone or in conjunction with hardware. The systems or methods of the present disclosure may also be implemented in software stored on a non-transitory computer-readable medium and executed as a computer program on a general purpose or special purpose computer. For clarity, only those aspects of the system germane to the present disclosure are described, and product details well known in the art are omitted. For the same reason, the computer hardware is not described in further detail. It should thus be understood that the present disclosure is not limited to any specific computer language, program, or computer. It is further contemplated that the present disclosure may be run on a stand-alone computer system or may be run from a server computer system that can be accessed by a plurality of client computer systems interconnected over an intranet network, or that is accessible to clients over the Internet. In addition, many embodiments of the present disclosure have application to a wide range of industries. To the extent the present disclosure discloses a system, the method implemented by that system, as well as software stored on a computer-readable medium and executed as a computer program to perform the method on a general purpose or special purpose computer, are within the scope of the present disclosure. Further, to the extent the present disclosure discloses a method, a system of apparatuses configured to implement the method are within the scope of the present disclosure.

It should be understood, of course, that the foregoing relates to exemplary embodiments of the invention and that modifications may be made without departing from the spirit and scope of the invention.

What is claimed is:

1. A system comprising:
   at least one computer processor; and
   one or more non-transitory memory storing a set of instructions, that when executed by the at least one computer processor cause the at least one computer processor to:
      receive a telephone call from a telephonic device identified with a telephone number and associated with a caller;
      determine the telephone number associated with the telephonic device;
      receive an indicator, the indicator being a request for digital information to be transmitted to the telephonic device; and
      transmit the requested digital information as at least one of a text message, an SMS, an MMS, and an email, to the telephonic device with the telephone number without utilizing a pre-populated database.

2. The system of claim 1, wherein the indicator is a termination of the telephone call by the caller.

3. The system of claim 1, further comprising:
   an interactive voice response (IVR) that is in communication with the at least one computer processor and the one or more non-transitory memory, wherein the IVR is configured to interact with the caller and gather information from the caller, the gathered information being the indicator.

4. The system of claim 3, wherein interacting with the caller and gathering information from the caller comprises receiving at least one of a voice recognition input and a dual-tone multi-frequency tones input.

5. The system of claim 1, further comprising an interactive voice response module in communication with the at least one computer processor and the one or more non-transitory memory, the interactive voice response module providing one or more option menu to the caller, the one or more option menu being a selectable choice regarding the digital information to be transmitted.

6. The system of claim 1, wherein the instructions, that when executed by the at least one computer processor cause the at least one computer processor to store the telephone number in a caller database after receiving the telephone call from the telephonic device.

7. The system of claim 1, wherein the instructions, that when executed by the at least one computer processor cause the at least one computer processor to notify the caller that text and data rates may apply prior to transmitting the digital information.

8. A system comprising:
at least one computer processor;
a caller identification module; and
one or more non-transitory memory storing a set of instructions, that when executed by the at least one computer processor cause the at least one computer processor to:
receive a telephone call from a telephonic device having a phone number and associated with a caller;
determine, by the caller identification module, the phone number associated with the telephonic device to obtain a determined phone number without input from the caller;
receive an indicator, the indicator being a request for digital information to be transmitted to the telephonic device, the indicator being a termination of the telephone call by the caller; and
transmit the requested digital information as at least one of a text message, an SMS, an MMS, and an email to the telephonic device without utilizing a pre-populated database.

9. The system of claim 8, wherein the instructions, that when executed by the at least one computer processor cause the at least one computer processor to store the telephone number in a caller database after receiving the telephone call from the telephonic device.

10. The system of claim 8, wherein the instructions, that when executed by the at least one computer processor cause the at least one computer processor to notify the caller that text and data rates may apply prior to transmitting the digital information.

11. A system comprising:
at least one computer processor; and
one or more non-transitory memory storing a set of instructions, that when executed by the at least one computer processor cause the at least one computer processor to:
receive a telephone call from a telephonic device having a phone number and associated with a caller;
receive an alternative telephone number associated with an alternative telephonic device from the caller entering the alternative telephone number into the telephonic device;
receive an indicator, the indicator being a request for digital information to be transmitted to the telephonic device; and
transmitting the requested digital information as at least one of a text message, an SMS, an MMS, and an email to the alternative telephonic device-without utilizing a pre-populated database.

12. The system of claim 11, wherein the instructions, that when executed by the at least one computer processor cause the at least one computer processor to notify the caller that text and data rates may apply prior to transmitting the digital information.

* * * * *